(12) United States Patent
Razavi et al.

(10) Patent No.: US 8,481,665 B2
(45) Date of Patent: Jul. 9, 2013

(54) POLYOLEFIN PRODUCTION

(75) Inventors: Abbas Razavi, Mons (BE); Liliana Peters, Marbais (BE)

(73) Assignee: Total Research & Technology Feluy, Seneffe (Feluy) (BE)

( * ) Notice: Subject to any disclaimer, the term of this patent is extended or adjusted under 35 U.S.C. 154(b) by 0 days.

(21) Appl. No.: 13/533,823

(22) Filed: Jun. 26, 2012

(65) Prior Publication Data

US 2012/0271013 A1 Oct. 25, 2012

Related U.S. Application Data

(60) Division of application No. 12/111,755, filed on Apr. 29, 2008, now Pat. No. 8,367,787, which is a continuation of application No. 11/441,306, filed on May 25, 2006, now abandoned, which is a division of application No. 10/143,467, filed on May 9, 2002, now abandoned, which is a division of application No. 09/299,436, filed on Apr. 26, 1999, now abandoned.

(30) Foreign Application Priority Data

Apr. 27, 1998 (EP) .................................... 98107623

(51) Int. Cl.
  *C08F 210/02* (2006.01)
  *C08F 210/08* (2006.01)
  *C08F 210/14* (2006.01)
  *C08F 210/16* (2006.01)
  *C08G 61/00* (2006.01)

(52) U.S. Cl.
  USPC ..................... 526/348; 526/348.5; 526/348.6; 526/352; 526/160; 526/170; 526/943; 526/941; 528/396

(58) Field of Classification Search
  USPC ..................... 526/348.6, 348.5, 348
  See application file for complete search history.

(56) References Cited

U.S. PATENT DOCUMENTS

| | | | | |
|---|---|---|---|---|
| 5,614,297 A | * | 3/1997 | Velazquez | 428/212 |
| 5,914,289 A | * | 6/1999 | Razavi | 502/107 |
| 6,100,357 A | * | 8/2000 | Smith et al. | 526/348 |
| 6,103,656 A | * | 8/2000 | Razavi | 502/152 |
| 6,194,526 B1 | * | 2/2001 | Benham et al. | 526/64 |
| 7,217,463 B2 | * | 5/2007 | Henderson | 428/516 |

FOREIGN PATENT DOCUMENTS

| | | | |
|---|---|---|---|
| EP | 798 317 A1 | * | 3/1997 |
| JP | 08-311121 A | | 11/1996 |
| JP | 10-130322 A | | 5/1998 |

OTHER PUBLICATIONS

Izzo, L.; Caporaso, L.; Senatore, G.; Oliva, L. Macromolecules, 1999, 32, 6913-6916.*

* cited by examiner

*Primary Examiner* — Rip A. Lee

(57) ABSTRACT

Use of a metallocene compound of general formula $Ind_2R''MQ_2$ as a component of a catalyst system in producing polyethylene, wherein each Ind is the same or different and is indenyl or substituted indenyl; R" is a bridge which comprises a $C_1$ to $C_4$ alkylene radical, a dialkyl germanium or silicon or siloxane, alkyl phosphine or amine, which bridge is substituted or unsubstituted, M is a Group IV metal or vanadium and each Q is hydrocarbyl having 1 to 20 carbon atoms or halogen; and the ratio of meso to racemic forms of the metallocene in the catalyst system is at least 1:3. The metallocene may be supported. The ethylene may be polymerized in a reaction medium that is substantially free of any external comonomer, with comonomer being formed in situ. The produced polyethylene may have long chain branching. The produced polyethylene may be atactic.

12 Claims, 2 Drawing Sheets

POLYOLEFIN PRODUCTION

CROSS-REFERENCE TO RELATED APPLICATIONS

This application is a divisional of U.S. application Ser. No. 12/111,755, filed on Apr. 29, 2008, which is a Continuation of U.S. application Ser. No. 11/441,306, filed on May 25, 2006, now abandoned, which is a divisional of U.S. application Ser. No. 10/143,467, filed on May 9, 2002, now abandoned, which is a divisional of U.S. application Ser. No. 09/299,436, filed on Apr. 26, 1999, now abandoned, which claims priority to European Application No. 98107623.5, filed on Apr. 27, 1998.

FIELD OF INVENTION

Figure 1:
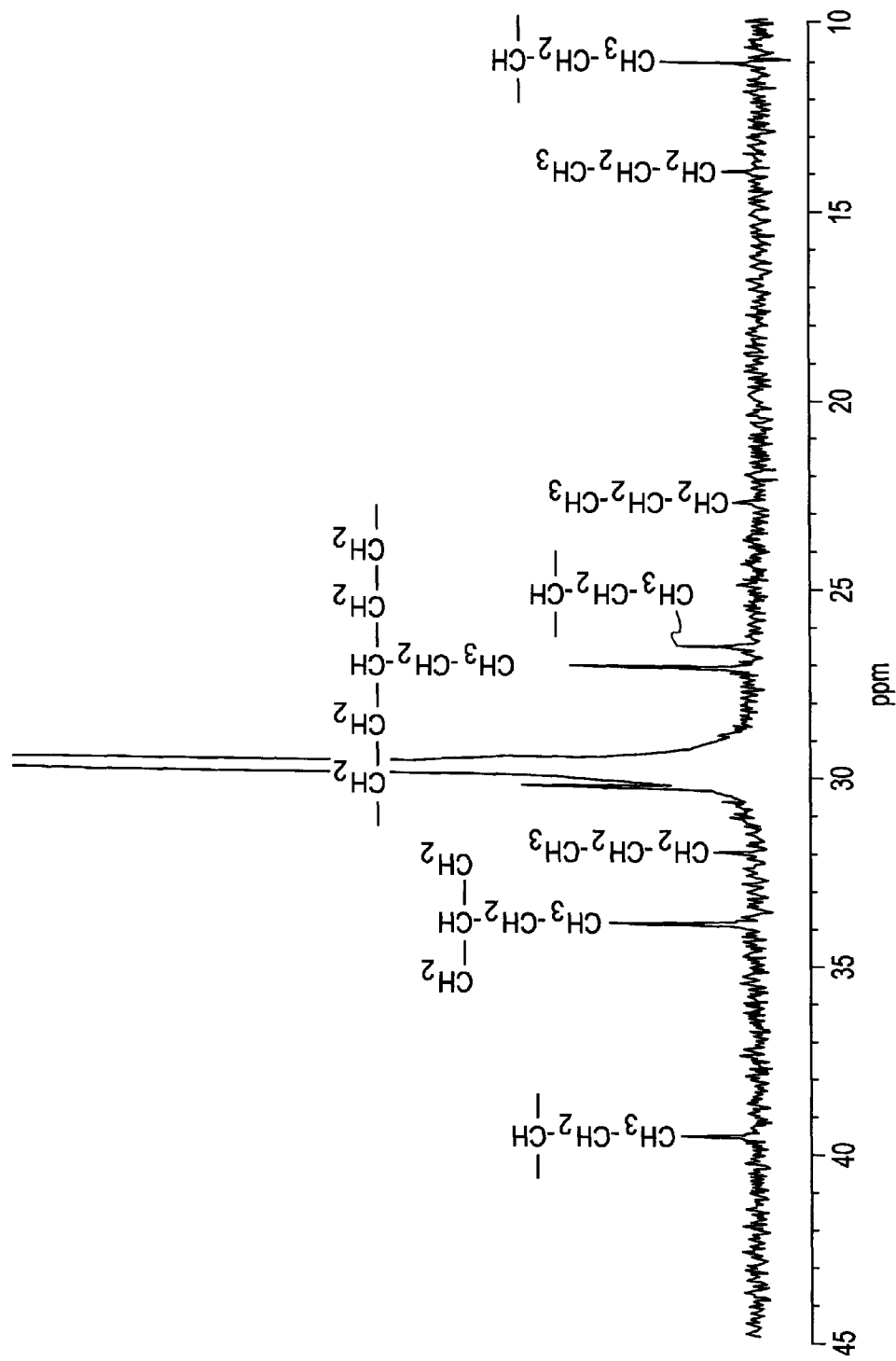
FIG. 1 shows a 13C NMR spectrum of a polyethylene made in accordance with the present invention.

The present invention relates to a process for the preparation of polyethylenes and to the use of metallocene compounds as catalyst components for use in such a process.

DESCRIPTION

Metallocene-catalysed polymerisation of ethylene is well-known and it is common practice to add to the ethylene monomer a comonomer such as butene. This has the advantage of modifying the properties of the polyethylene so as to make a range of copolymer products with various mechanical properties.

Racemic (bis indenyl) ethane zirconium dichloride complexes are known to be very active polymerisation catalysts for the production of polyethylene and low molecular weight isotactic polypropylene in combination with a cocatalyst such as methyl aluminoxane. The conventional synthetic procedures for producing the racemic complexes also produce a side product, which is the meso isomer, at a typical level of 3-5%.

CA-A-2104036 is directed to the use of various rac/meso mixtures primarily as catalysts in the production of isotactic polypropylenes. This patent application also discloses the use of the meso form of certain metallocenes to produce atactic polypropylene. In one example, this patent application also discloses the use of a 95:5 rac/meso metallocene in the production of a propylene, ethylene block copolymer.

The present applicants have surprisingly found that the mesa form of certain metallocenes can be advantageously used as a catalyst in the polymerisation of ethylene without the need to add exogenous butene to the reaction mix.

The present invention provides use of a metallocene compound of general formula $Ind_2R''MQ_2$ as a component of a catalyst system in the production of polyethylene, wherein each Ind is the same or different and is indenyl or substituted indenyl; R'' is a bridge which comprises a $C_1$ to $C_4$ alkylene radical, a dialkyl germanium or silicon or siloxane, alkyl phosphine or amine, which bridge is substituted or unsubstituted, M is a Group IV metal or vanadium and each Q is hydrocarbyl having 1 to 20 carbon atoms or halogen; and the ratio of meso to racemic forms of the metallocene in the catalyst system is at least 1:3.

The present invention further provides a process for the preparation of polyethylene, which comprises polymerising ethylene, optionally with hydrogen, in the presence of a catalyst system comprising
(a) a metallocene compound of general formula $Ind_2R''MQ_2$ as defined in any one of claims 1 to 7;
(b) a cocatalyst which activates the metallocene compound; and
(c) an inert support; wherein the ratio of meso to racemic forms of the metallocene in the catalyst system is at least 1:3.

Each indenyl may bear one or more substituent groups, each of which may be independently chosen from those of formula $XR_v$ in which X is chosen from group IVA, oxygen and nitrogen and each R is the same or different and chosen from hydrogen or hydrocarbyl of from 1 to 20 carbon atoms and v+1 is the valence of X. X is preferably C. If the cyclopentadienyl ring is substituted, its substituent groups must not be so bulky as to affect coordination of the olefin monomer to the metal M. Substituents on the cyclopentadienyl ring preferably have R as hydrogen or CH3. More preferably, at least one and most preferably both cyclopentadienyl rings are unsubstituted. Each indenyl may be present in reduced form with up to 4 hydrogen substituents, such as in a 4, 5, 6, 7 tetrahydroindenyl.

In a particularly preferred embodiment, both indenyls are unsubstituted.

R'' is preferably an ethylene bridge which is substituted or unsubstituted.

The metal M is preferably zirconium, hafnium or titanium, most preferably zirconium. Each Q is the same or different and may be a hydrocarbyl or hydrocarboxy radical having 1-20 carbon atoms or a halogen. Suitable hydrocarbyls include aryl, alkyl, alkenyl, alkylaryl or aryl alkyl. Each Q is preferably halogen. Ethylene bis(1-indenyl) zirconium dichloride is a particularly preferred bis indenyl compound of the present invention.

The metallocene catalyst component used in the present invention can be prepared by any known method. A preferred preparation method is described in J. Org. Chem. 288, 63-67 (1985).

The cocatalyst which activates the metallocene catalyst component can be any cocatalyst known for this purpose such as an aluminium-containing cocatalyst or a boron-containing cocatalyst. The aluminium-containing cocatalyst may comprise an alumoxane, an alkyl aluminium and/or a Lewis acid.

The alumoxanes used in the process of the present invention are well known and preferably comprise oligomeric linear and/or cyclic alkyl alumoxanes represented by the formula:

for oligomeric, linear alumoxanes and

for oligomeric, cyclic alumoxane, wherein n is 1-40, preferably 10-20, m is 3-40, preferably 3-20 and R is a $C_1$-$C_8$ alkyl group and preferably methyl.

Generally, in the preparation of alumoxanes from, for example, aluminium trimethyl and water, a mixture of linear and cyclic compounds is obtained.

Suitable boron-containing cocatalysts may comprise a triphenylcarbenium boronate such as tetrakis-pentafluorophenyl-borato-triphenylcarbenium as described in EP-A-0427696, or those of the general formula [L'-H]+ [$BAr_1Ar_2X_3X^4$]—as described in EP-A-0277004 (page 6, line 30 to page 7, line 7).

Preferably, the same catalyst system is used in both steps (i) and (ii) of the process. The catalyst system may be employed in a solution polymerisation process, which is homogeneous, or a slurry process, which is heterogeneous. In a solution process, typical solvents include hydrocarbons with 4 to 7 carbon atoms such as heptane, toluene or cyclohexane. In a slurry process it is necessary to immobilise the catalyst system on an inert support, particularly a porous solid support such as talc, inorganic oxides and resinous support materials such as polyolefin. Preferably, the support material is an inorganic oxide in its finally divided form.

Suitable inorganic oxide materials which are desirably employed in accordance with this invention include Group 2a, 3a, 4a or 4b metal oxides such as silica, alumina and mixtures thereof. Other inorganic oxides that may be employed either alone or in combination with the silica, or alumina are magnesia, titania, zirconia, and the like. Other suitable support materials, however, can be employed, for example, finely divided functionalized polyolefins such as finely divided polyethylene.

Preferably, the support is a silica having a surface area comprised between 200 and 900 m2/g and a pore volume comprised between 0.5 and 4 ml/g.

The amount of alumoxane and metallocenes usefully employed in the preparation of the solid support catalyst can vary over a wide range. Preferably the aluminium to transition metal mole ratio is in the range between 1:1 and 100:1, preferably in the range 5:1 and 50:1.

The order of addition of the metallocenes and alumoxane to the support material can vary. In accordance with a preferred embodiment of the present invention alumoxane dissolved in a suitable inert hydrocarbon solvent is added to the support material slurried in the same or other suitable hydrocarbon liquid and thereafter a mixture of the metallocene catalyst component is added to the slurry.

Preferred solvents include mineral oils and the various hydrocarbons which are liquid at reaction temperature and which do not react with the individual ingredients. Illustrative examples of the useful solvents include the alkanes such as pentane, iso-pentane, hexane, heptane, octane and nonane; cycloalkanes such as cyclopentane and cyclohexane; and aromatics such as benzene, toluene, ethylbenzene and diethylbenzene.

Preferably the support material is slurried in toluene and the metallocene and alumoxane are dissolved in toluene prior to addition to the support material.

Preferably no comonomer is added to the ethyl and hydrogen during the polymerisation. This avoids the need to remove unwanted excess butene or other comonomer.

The polyethylene formed in accordance with the present invention preferably has long chain branching with a shear ratio of preferably at least 20, more preferably at least 30. These properties confer upon the polyethylene good processability characteristics and a smooth glossy surface.

Without wishing to be bound by any theory it is postulated that comonomer is not required in the polymerisation because butene is formed in situ at the active site of the metallocene catalyst, probably by ethylene dimersation. Butene found in situ would react very quickly with a growing polymer chain because no diffusion barrier would be present.

Figure 2:
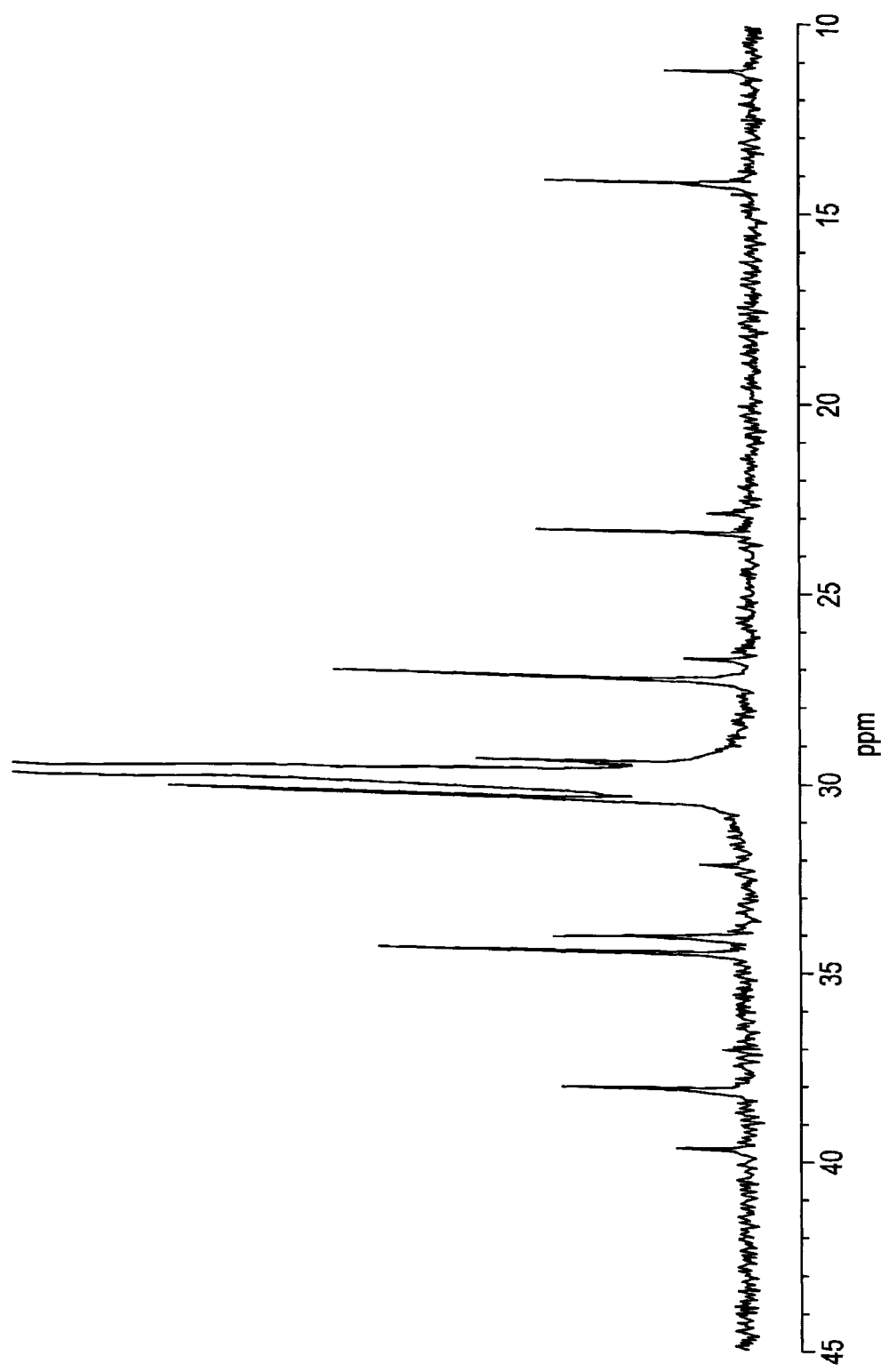
FIG. 2 shows a 13C NMR spectrum of a further polyethylene made in accordance with the present invention.

The invention will now be described in further detail, by way of example only, with reference to the following Examples and the accompanying drawings, in which:

FIG. 1 shows a 13C NMR spectrum of a polyethylene made in accordance with the present invention; and FIG. 2 shows a 13C NMR spectrum of a further polyethylene made in accordance with the present invention.

EXAMPLE 1

Catalyst Preparation (a) Synthesis of the Stereoisomers

High yield rapid synthesis of the rac/meso(bisindenyl) ethanezirconium dichloride: The freshly prepared diaromatized bisindenylethane ligand is suspended in pentane and reacted with an equimolar suspension of $ZrCl_4$ in pentane. The slurry is stirred for three Hours and filtered. Yellow solid is extracted with methylene chloride to separate the LiCl. According to NMR of the crude product a more or less quantitative yield for the rac/meso mixture is obtained according to this method.

(b) Isolation of the Pure Stereoisomers

Solubility test showed that the meso isomer has about three times higher solubility in toluene. In this way the meso can be concentrated in toluene and completely separated from the racemic byproduct.

The support used in a silica having a total pore volume of 4.217 ml/g and a surface area of 322 $m^2$/g. This silica is further prepared by drying in high vacuum on a schlenk line for three hours to remove the physically absorbed water. 5 g of this silica are suspended in 50 ml of toluene and placed in a round bottom flask equipped with magnetic stirrer, nitrogen inlet and dropping funnel.

An amount of 0.31 g of the metallocene is reacted with 25 ml of methylalumoxane (MAO 30 wt % in toluene) at a temperature of 25° C. during 10 minutes to give a solution mixture of the corresponding metallocenium cation and the anionic methylalumoxane oligomer.

Then the resulting solution comprising the metallocenium cation and the anionic methylalumoxane oligomer is added to the support under a nitrogen atmosphere via the dropping funnel which is replaced immediately after with a reflux condenser. The mixture is heated to 110° C. for 90 minutes. Then the reaction mixture is cooled down to room temperature, filtered under nitrogen and washed with toluene.

The catalyst obtained is then washed with pentane and dried under a mild vacuum.

EXAMPLE 2

Polymerisation Procedure and Results

Ethylene was polymerised under the conditions described in Table 1 in a 4 l batch reactor at a temperature of 80° C. for a residence time of 60 mins. Supported catalyst was precontacted with triisobutylaluminium (TBAC) and introduced into the reactor in which 2 l of isobutene were used as diluent. The metallocene was present at 100 mg and the cocatalyst at 390 ppm.

TABLE 1

| Run | Hydrogen (wt %-NL) | Comonomer (wt %) | Yield (g) | Hourly Prod (g/g · hr) | M12 (g/10') | HLMI (g/10') | SR | Density (g/cc) | Bulk Density (g/cc) |
|---|---|---|---|---|---|---|---|---|---|
| A | 0 | 0.00 | 183 | 1830 | 0.14 | 8.47 | 60 | 0.9438 | 0.28 |
| B | 0 | 1.22 | 250 | 2500 | 0.65 | 27.06 | 42 | 0.9385 | 0.37 |
| C | 0 | 2.44 | 346 | 3460 | 1.23 | 40.31 | 33 | 0.9380 | 0.27 |
| D | 0 | 3.66 | 390 | 3900 | 2.47 | 74.42 | 30 | 0.9550 | 0.29 |
| E | 0 | 4.88 | 270 | 2700 | 4.98 | 152.40 | 31 | 0.9521 | 0.30 |
| F | 0.25 | 0.00 | 166 | 1660 | 1.94 | 65.94 | 34 | 0.9530 | 0.36 |
| G | 0.25 | 1.22 | 345 | 3450 | 0.78 | 28.57 | 37 | 0.9623 | 0.35 |
| H | 0.25 | 2.44 | 255 | 2550 | 4.75 | 157.60 | 33 | 0.9429 | 0.31 |
| I | 0 | 0.00 | 338 | 3380 | 0.06 | 3.75 | 60 | 0.9574 | 0.24 |
| J | 0 | 2.44 | 695 | 6950 | 0.14 | 8.63 | 62 | 0.9366 | 0.35 |
| K | 0.25 | 2.44 | 676 | 6760 | 0.54 | 21.76 | 40 | 0.9421 | 0.39 |
| L | 0.25 | 3.66 | 720 | 7200 | 0.58 | 23.37 | 40 | 0.9407 | 0.34 |
| M | 0.25 | 4.88 | 922 | 9220 | 0.72 | 25.38 | 35 | 0.9394 | 0.32 |

| Run | Hydrogen (wt %-NL) | Comonomer (wt %) | Mn (kDa) | Mw (kDa) | Mz (kDa) | Mp (kDa) | D | D' |
|---|---|---|---|---|---|---|---|---|
| A | 0 | 0.00 | 28.376 | 134.8 | 451.0 | 94 | 4.7 | 3.4 |
| B | 0 | 1.22 | 26.388 | 101.6 | 334.6 | 53 | 3.9 | 3.3 |
| C | 0 | 2.44 | 23.139 | 94.6 | 354.7 | 45 | 4.1 | 3.8 |
| D | 0 | 3.66 | 22.848 | 75.0 | 215.0 | 42 | 3.3 | 2.9 |
| E | 0 | 4.88 | 19.658 | 64.6 | 202.0 | 32 | 3.3 | 3.1 |
| F | 0.25 | 0.00 | 15.320 | 88.8 | 421.4 | 43 | 5.8 | 4.7 |
| G | 0.25 | 1.22 | 25.920 | 105.7 | 366.3 | 56 | 4.1 | 3.5 |
| H | 0.25 | 2.44 | 17.528 | 73.6 | 262.8 | 37 | 4.2 | 3.6 |
| I | 0 | 0.00 | 37.464 | 155.2 | 528.2 | 65 | 4.1 | 3.4 |
| J | 0 | 2.44 | 34.036 | 122.0 | 375.5 | 60 | 3.6 | 3.1 |
| K | 0.25 | 2.44 | 25.657 | 115.1 | 423.9 | 56 | 4.5 | 3.7 |
| L | 0.25 | 3.66 | 25.164 | 110.3 | 402.4 | 52 | 4.4 | 3.6 |
| M | 0.25 | 4.88 | 27.177 | 99.5 | 335.1 | 49 | 3.7 | 3.4 |

Runs A to H, Ethylene 6 wt %; Runs I to M, Ethylene 10 wt %

Table 1 represents the polymerisation conditions, results and polymer analysis for the meso stereoisomer. The polymerization activity increases with increasing comonomer content in the feed regardless if hydrogen is present or not. A maximum activity of 4000 g PE/g cat for 6% ethylene and 10000 g PE/g cat for 10% ethylene concentration has been reached with different hexene concentration at this stage. The density behaviour is also interesting with respect to the hexene concentration; it does not decrease gradually with increasing hexene concentration. This behaviour is related to the in situ butene formation (cf. 13C NMR). For a monomodal polymer formed with a single site catalyst the SRs of the polymers are very large (35-60). The most important practical consequence of large SR, related to long chain branching (cf. 13C NMR), is the fact that the specimens that have been obtained from the melt indexer show no signs of melt fracture (good processibility) and the corresponding plaques are of very smooth and glossy surfaces.

13C NMR Analysis of PE Homo- and Copolymers

Table 2 sets out the results of 13C NMR analysis of the polyethylenes produced under the conditions of some of the runs detailed in Table 1. The averages of three NMR analyses are shown. Representative spectra from runs A and C are shown in FIGS. 1 and 2 respectively. The spectra indicate a very good comonomer incorporation capability and the formation of long chain branching. In addition to the hexene (Butane branching) substantial amounts of butene (ethyl branching) are observed in the backbone of the polymers. Most important is the signal pattern of the spectrum in FIG. 1 of the polymer produced in the absence of any type of external comonomer. It shows up to 1 wt % Butene and confirms the in situ formation of butene via dimerization of ethylene. Since no other signals related to other comonomers is observed it can be concluded that the dimerization mechanism is very specific. The formation of long chain branching and comomoner is part of the unique properties of this catalytic system.

TABLE 2

| | Hydrogen (wt %-NL) | Comonomer (wt %) | % C4m | % C4w | % C6m | % C6w |
|---|---|---|---|---|---|---|
| A | 0 | 0 | 0.44 | 0.88 | 0 | 0 |
| B | 0 | 1.22 | 0.38 | 0.75 | 0.44 | 1.31 |
| C | 0 | 2.44 | 0.27 | 0.53 | 0.75 | 2.21 |
| D | 0 | 3.66 | 0.26 | 0.51 | 1.14 | 3.32 |
| E | 0 | 4.88 | 0.30 | 0.58 | 1.72 | 4.97 |
| G | 0.25 | 1.22 | 0.28 | 0.57 | 0.17 | 0.52 |
| I | 0 | 0 | 0.37 | 0.74 | 0 | 0 |
| J | 0 | 2.44 | 0.33 | 0.65 | 0.50 | 1.48 |
| L | 0.25 | 3.66 | 0.24 | 0.48 | 0.49 | 1.45 |

% Cm = molar % compared with ethylene
% Cw = weight % compared with ethylene

We claim:

1. A branched polyethylene copolymer formed by a process comprising:
   supplying ethylene monomer;
   supplying hexene monomer;
   forming butene in situ and copolymerizing the ethylene monomer, the hexene monomer and the butene monomer formed in situ in a reaction medium which comprises a solution or slurry with a catalyst system comprising:
   a metallocene compound of general formula $Ind_2R''MQ_2$ having a mole ratio of meso to racemic forms of the metallocene of at least 1:3, wherein
   each Ind is the same or different and is indenyl or substituted indenyl, R" is a bridge that is substituted or unsubstituted and comprises a $C_1$ to $C_4$ alkylene radical, a dialkyl germanium or silicon or siloxane, alkyl phosphine or amine, M is a Group IV metal or vanadium, each Q is a hydrocarbyl having 1 to 20 carbon atoms or a halogen, said catalyst being further comprised of an inert support; and using a cocatalyst which activates the metallocene compound;

wherein the shear ratio of the copolymer is between 35 and 60.

2. The copolymer of claim 1, wherein the cyclopentadienyl ring of at least one of the indenyls is unsubstituted.

3. The copolymer of claim 1, wherein the R" is an ethylene bridge.

4. The copolymer of claim 1, wherein both indenyls are unsubstituted.

5. The copolymer of claim 1, wherein M is Zr.

6. The copolymer of claim 1, wherein the Q is a halogen.

7. The copolymer of claim 1, wherein the cocatalyst comprises an aluminum-containing cocatalyst or a boron-containing cocatalyst.

8. The copolymer of claim 7, wherein the cocatalyst is an aluminum-containing cocatalyst comprising an alumoxane, an alkyl aluminum or a Lewis acid.

9. The copolymer of claim 1, wherein the butene monomer is formed in situ by dimerization of the ethylene.

10. The copolymer of claim 1, wherein the copolymer has ethyl branching arising from butene incorporation into the backbone of the copolymer.

11. The copolymer of claim 10, wherein the copolymer has butane branching.

12. The copolymer of claim 1, wherein there is no diffusion barrier between the butene monomer formed in situ and the growing copolymer.

* * * * *